(12) United States Patent
Chang

(10) Patent No.: US 8,514,291 B2
(45) Date of Patent: Aug. 20, 2013

(54) DIGITAL PHOTO FRAME HAVING STEREO CAMERA MODULE

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 304 days.

(21) Appl. No.: 12/788,307

(22) Filed: May 27, 2010

(65) Prior Publication Data

US 2011/0157377 A1    Jun. 30, 2011

(30) Foreign Application Priority Data

Dec. 31, 2009   (CN) .......................... 2009 1 0312943

(51) Int. Cl.
  *H04N 5/232*  (2006.01)
  *H04N 5/247*  (2006.01)
  *H04N 15/00*  (2006.01)
  *G03B 35/00*  (2006.01)
  *G02B 27/22*  (2006.01)

(52) U.S. Cl.
  USPC ........ 348/211.11; 348/47; 348/264; 396/325; 396/329; 359/462

(58) Field of Classification Search
  USPC ........ 348/42–60, 211.11, 262–265, 373–376; 396/322, 324, 325, 329, 330; 359/462–477; 74/89, 89.2–89.22; 476/15–17; 49/116–123
  See application file for complete search history.

(56) References Cited

U.S. PATENT DOCUMENTS

| 2008/0225129 A1* | 9/2008 | Viinikanoja et al. ........ 348/218.1 |
| 2008/0294298 A1* | 11/2008 | Park .............................. 700/302 |
| 2009/0079817 A1* | 3/2009 | Su .................................. 348/47 |

FOREIGN PATENT DOCUMENTS

| CN | 1922894 A | 2/2007 |
| CN | 101400002 A | 4/2009 |

* cited by examiner

*Primary Examiner* — Sinh Tran
*Assistant Examiner* — Mark Monk
(74) *Attorney, Agent, or Firm* — Altis Law Group, Inc.

(57) ABSTRACT

A digital photo frame includes a display module, a frame body and a stereo camera module. The frame body is includes a plurality of sides connected end to end. The sides are mounted around the display module. The stereo camera module includes two cameras and an image combination chip. The two cameras are configured for capturing two respective images of an object from two different viewing angles. The image combination chip is configured for combining the images captured by the two cameras to form a three-dimensional image. The two cameras are slidable along one of the sides of the frame body. The display module is capable of displaying the three-dimensional image.

6 Claims, 3 Drawing Sheets

DIGITAL PHOTO FRAME HAVING STEREO CAMERA MODULE

BACKGROUND

1. Technical Field

The present disclosure relates to a digital photo frame having a stereo camera module.

2. Description of Related Art

The typical digital photo frames can just be used for displaying two-dimensional images. Three-dimensional images cannot be displayed by the typical digital photo frames. In addition, a stereo camera module typically includes two cameras. Three-dimensional images are obtained by combinations of two-dimensional images captured by the two cameras. However, a relative position between the two cameras is unchangeable. When capturing images of an object from different viewing angles, the stereo camera module should be entirely moved. This is inconvenient for users of the stereo camera module. Sometimes, the number of the cameras of a stereo camera module may be more than two to achieve a better stereo quality. However, the additional camera(s) may increase the cost of the stereo camera module.

Therefore, a digital photo frame that can overcome the above-mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
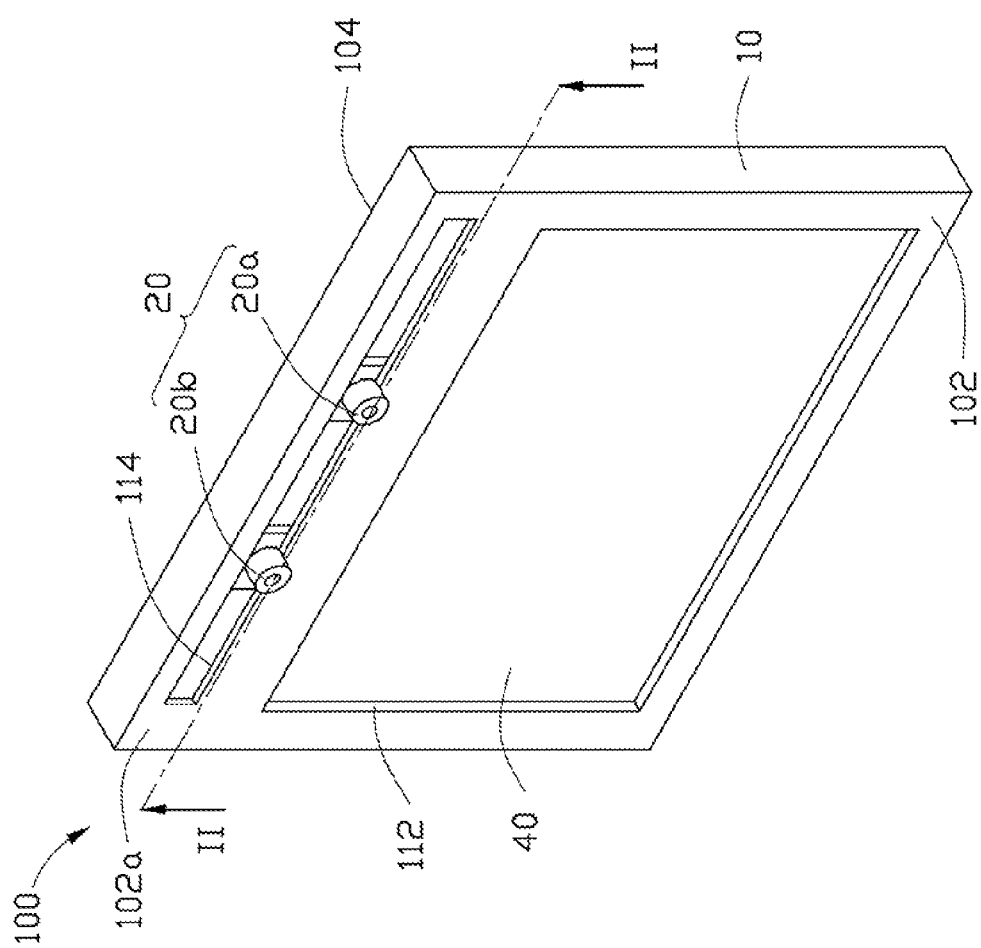
FIG. 1 is a schematic, isometric view of a digital photo frame having a stereo camera module in accordance with an exemplary embodiment.
Figure 2:
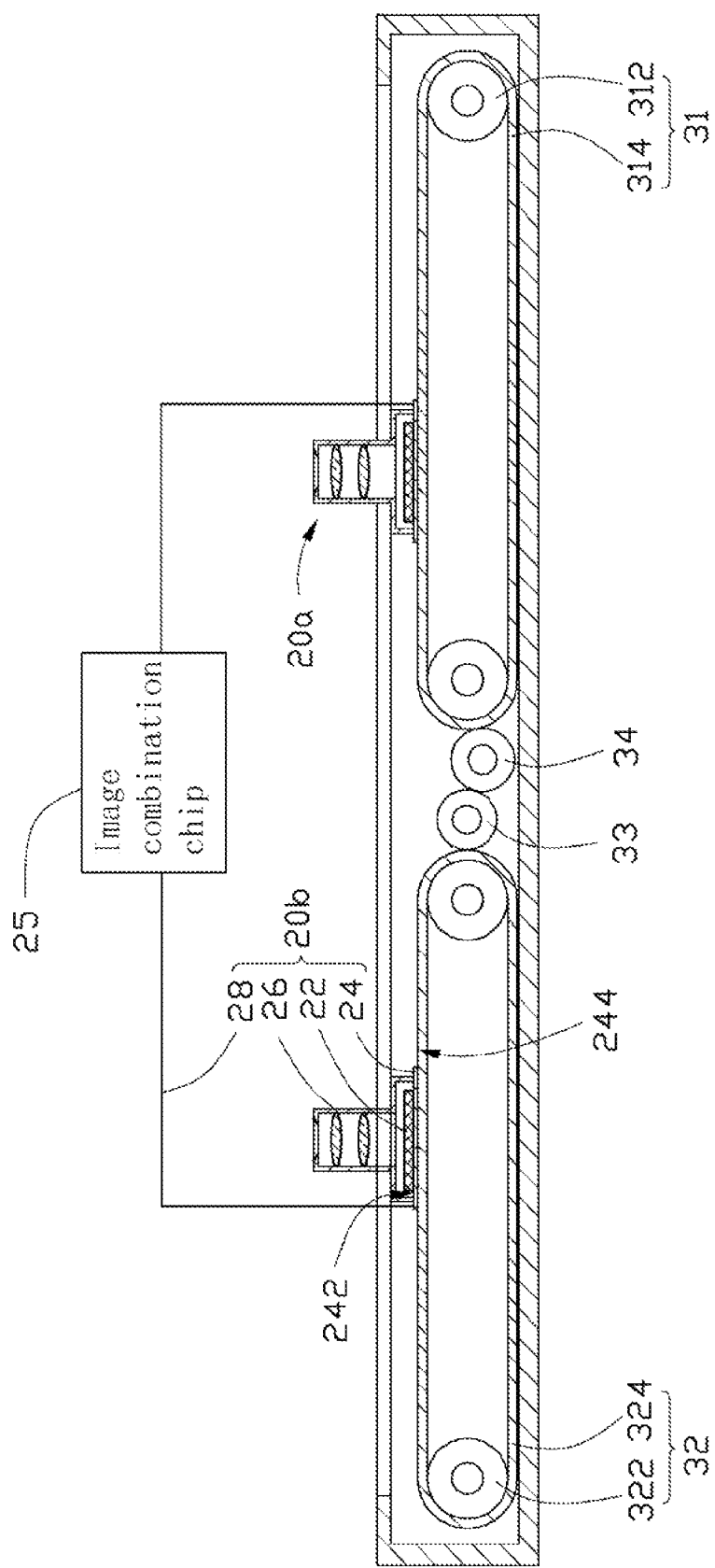
FIG. 2 is a sectional view taken along line II-II of FIG. 1, showing a structure of the stereo camera module.

Referring to FIGS. 1 and 2, a digital photo frame 100 according to an exemplary embodiment includes a frame body 10, a stereo camera module 20, a driving module 30, and a display module 40. The frame body 10 is mounted around the display module 40 for securing the display from damage. The cameras 20 are slidably installed on the frame body 10.

The frame body 10 is substantially rectangular and includes a front frame portion 102 and a back frame portion 104. The front frame portion 102 includes four sides connected perpendicularly end to end, and forms a substantially rectangular opening 112 surrounded by the four sides. The back frame portion 104 has a generally rectangular shape. The front frame portion 102 and a back frame portion 104 are coupled to each other. The display module 40 is placed on the back frame portion 104, and the four sides of the front fame portions 102 are mounted to four sides of the display module 40 such that the display module 40 is clamped by the front frame portion 102 and the back frame portion 104. The four sides of the front frame portion 102 include a top side 102a. The top side 102a defines an slot 114 therein. The slot 114 is extended substantially parallel to a lengthwise direction of the top side 102a.

The stereo camera module 20 includes a first camera 20a, a second camera 20b, and an image combination chip 25. In this embodiment, each of the first and second cameras 20a and 20b includes an image sensor 22, a base plate 24, a lens module 26 and a data cable 28. The image sensor 22 can be a charge couple device (CCD) or a complementary mental oxide semiconductor (CMOS) for transforming light signals into electric signals. The lens module 26 is optically aligned with the image sensor 22.

The base plate 24 can be selected from a group consisting of glass fiber, strengthened plastic, and ceramic. The base plate 24 has a support surface 242, and a bottom surface 244 facing away from the support surface 242. The image sensor 22 and the lens module 26 are fixed on the support surface 242. The base plate 24 includes an electro-circuit (not shown) therein. The image sensor 22 is electrically connected to the electro-circuit in the base plate 24. The electro-circuit in the base plate 24 of each of the first and second cameras 20a and 20b is electrically connected to the image combination chip 25 by the data cable 28. The image combination chip 25 is configured for receiving and combining the electric signals of the two-dimensional images captured by the first and second cameras 20a and 20b.

The driving module 30 includes a first chain drive system 31, a second chain drive system 32, a driving motor 33, and a reverse driving gear 34. The driving module 30 is installed in the frame body 10 adjacent to the top side 102a of the front frame portion 102. The first chain drive system 31 includes two sprocket wheels 312 and a sprocket chain loop 314. The second chain drive system 32 includes two sprocket wheels 322 and a sprocket chain loop 324.

The two sprocket wheels 312 of the first chain drive system 31 and the two sprocket wheels 322 of the second chain drive system 32 are rotatably mounted on an inner surface of the frame body 10. Rotation axes of the sprocket wheels 312 and 322 are substantially perpendicular to the extension direction of the slot 114, and are substantially parallel to a surface of the display module 40. The two sprocket wheels 312 and the two sprocket wheels 322 are arranged facing toward and along the slot 114. The first and second chain drive system 31 and 32 are adjacent to two opposite ends of the slot 114. The sprocket chain loop 314 extends around the upper and lower portions of the two sprocket wheels 312 in a loop, and is freely engaged with the sprocket wheels 312 such that rotation of sprocket wheels 312 causes the sprocket chain loop 314 to move around the sprocket wheels 312. The sprocket chain loop 324 extends around the upper and lower portions of the two sprocket wheels 322 in a loop, and is freely engaged with the sprocket wheels 322 such that rotation of sprocket wheels 322 causes the sprocket chain loop 314 move around the sprocket wheels 322. Therefore, an object fixed on the sprocket chain loop 314 or 324 can move along the slot 114 by virtue of the movement of the sprocket chain loops 314 or 324.

The driving motor 33 and the reverse driving gear 34 are arranged between the first and second chain drive systems 31 and 32. The diving motor 33 is arranged between the second chain drive system 32 and the reverse driving gear 34. The driving motor 33 and the reverse driving gear 34 each have a rotation axis parallel to the rotation axis of the sprocket wheels 312 and 322. The driving motor 33 is freely engaged with the reverse driving gear 34, and also is freely engaged with the sprocket chain loop 324 of the second sprocket chain system 32. The reverse driving gear 34 is freely engaged with the sprocket chain loop 314 of the first sprocket chain loop 31. The driving motor 33 is configured for providing a driving force to the sprocket chain loop 324 and the reverse driving gear 34. The reverse driving gear 34 is configured for driving the sprocket chain loop 314 of the first chain drive system 31 to move around the two sprocket wheels 312.

The base plate 24 of the camera 20a is fixed to the sprocket chain loop 314, and the lens module 26 of the camera 20a extends through the slot 114. The base plate 24 of the camera 20b is fixed to the sprocket chain loop 324, and the lens module 26 of the camera 20b extends through the slot 114. Thus, the first camera 20a and the second camera 20b are fixed to the first sprocket chain loop 314 and second sprocket chain loop 324, respectively.

In use, the driving motor 33 drives the second sprocket chain loop 324 and the reverse driving gear 34 to rotate. Assuming that the driving motor 33 rotates clockwise, the reverse driving gear 34 will rotate counter-clockwise, and the sprocket chain loop 324 will move around the two sprocket wheels 322 counter-clockwise. Thus, the camera 20b is driven to move away from the driving motor 33 along with the sprocket chain loop 324. Similarly, the reverse driving gear 34 drives the sprocket chain loop 314 to rotate clockwise, thus the camera 20a is driven away from the driving motor 33 along with the sprocket chain loop 314. In a word, the camera 20a and the camera 20b is driven to move away from each other. In contrast, when the driving motor 33 rotates counter-clockwise, the camera 20a and the camera 20b will move towards each other. That is, the first camera 20a and the second camera 20b are driven to move in reverse directions.

The reverse driving gear 34 can also be omitted. In such case, the driving motor 33 should be freely engaged with both of the sprocket chain loops 314 and 324. Under these circumstances, the first camera 20a and the second camera 20b can be driven to move in a same direction by virtue of rotation of the driving motor 33. Therefore, a distance between the first and second camera 20a and 20b may be unchanged when they move along the slot 114.

The digital photo frame 100 further includes a memory (not shown) for storing images captured by the stereo camera module 20 or images stored in other memories.

Figure 3:
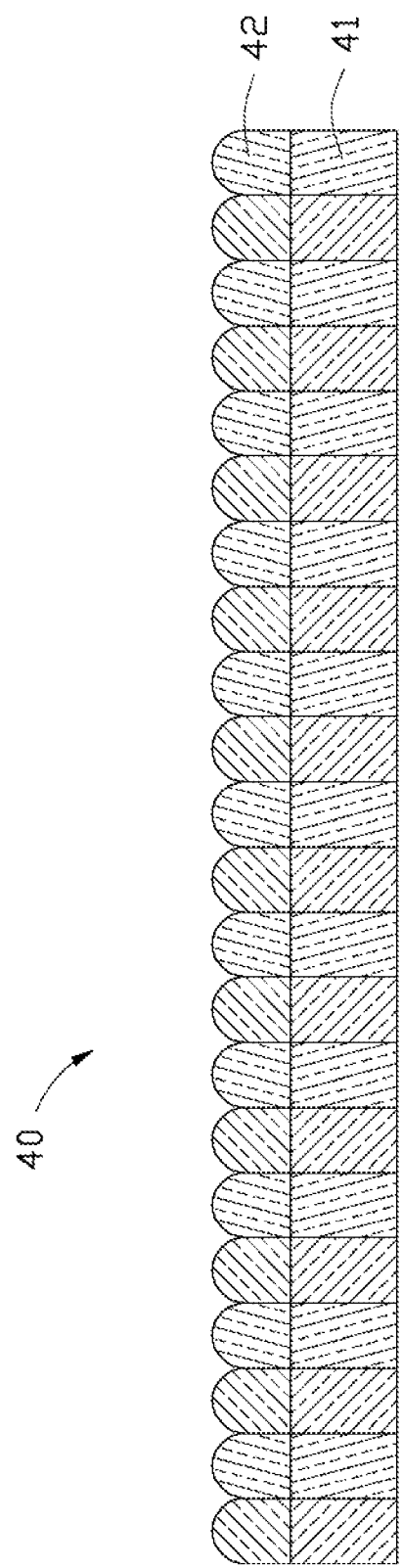
FIG. 3 is a sectional view of a display module comprised in the digital photo frame.

Referring also to FIG. 3, the display module 40 is a three-dimensional display module. The display module 40 includes a liquid crystal display panel 41 and a lenticular lens array 42 known in the art. The lenticular lens array 42 is arranged on the display panel 41. The display module 40 is configured for displaying three-dimensional images stored in the memory of the digital photo frame 100. The lenticular lens array 42 can direct images corresponding to left-eye and right-eye to a viewer in front of the display module 40 using algorithms known in the art. Thus, the images seen by the viewer are three-dimensional images.

Because of driving module 30, the first camera 20a and the second camera 20b can capture images of an object from moving viewing angles. After combining images captured by the first and second cameras 20a and 20b by the image combination chip 25, stereographs from different viewing angles or with better stereo quality will be obtained.

Also, the display module 40 can be other types of three-dimensional display module, for example the display module 40 displaying images corresponding to left-eye and right-eye at adjacent time intervals in a predetermined frequency. In such case, the images shown by the display module 40 is viewed by stereoscopic viewing glasses having a pair of optical-shutters. A method of using the stereoscopic viewing glasses to view the display module 40 is known in the art.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A digital photo frame, comprising:
a display module including four sides;
a frame body comprising a front frame portion and a back frame portion coupled to each other, the display module exposed at the front frame portion, the front frame portion comprising four side beams perpendicularly connected end to end, thereby forming a substantially rectangular opening surrounded by the four side beams, the four side beams of the front frame portions being attached to the four sides of the display module, the four side beams of the front frame portion comprising a top side beam, the top side beam of the frame body defining a slot;
a stereo camera module comprising two cameras and an image combination chip, the two cameras being slidably engaged in the slot for capturing two respective images of an object from two different viewing angles, the image combination chip being configured for combining the images captured by the two cameras to form a three-dimensional image, the two cameras being slidable along the top side beam of the frame body, the display module being capable of displaying the three-dimensional image; and
a driving module configured for driving the two cameras to slide along the slot, the driving module comprising two chain drive systems and a driving motor, each of the two chain drive systems comprising two sprocket wheels and a sprocket chain loop surrounding the two sprocket wheels and engaging with the sprocket wheels, the driving motor being configured for driving the sprocket chain loops to rotate around the corresponding sprocket wheels.

2. The digital photo frame of claim 1, wherein the driving module further comprises a reverse driving gear, the driving motor being engaged with one sprocket chain loop and the reverse driving gear, the reverse driving gear being engaged with the other sprocket chain loop.

3. The digital photo frame of claim 2, wherein the driving motor and the reverse driving gear are arranged between the two chain drive systems.

4. The digital photo frame of claim 1, wherein each of the cameras comprises an image sensor, a lens module, and a base plate, the lens module being optically aligned with the image sensor, the lens module and the image sensor being fixed on the base plate, the base plates being fixed on the corresponding sprocket chain loops.

5. The digital photo frame of claim 1, wherein the display module comprises a liquid crystal display and a lenticular lens array arranged on the liquid crystal display.

6. The digital photo frame of claim 1, wherein rotation axes of the sprocket wheels are substantially perpendicular to the extension direction of the slot, and are substantially parallel to a surface of the display module.

* * * * *